United States Patent
Johnson

[15] 3,671,501
[45] June 20, 1972

[54] LACTAM POLYMERIZATION WITH SUBSTITUTED BIURET INITIATORS

[72] Inventor: Herbert E. Johnson, South Charleston, W. Va.

[73] Assignee: Union Carbide Corporation, New York, N.Y.

[22] Filed: July 9, 1970

[21] Appl. No.: 53,667

[52] U.S. Cl.................................260/78 L, 260/78 P
[51] Int. Cl....................................C08g 20/12, C08g 20/18
[58] Field of Search...........................260/78 L, 78 P

[56] References Cited

UNITED STATES PATENTS

| | | | |
|---|---|---|---|
| 3,028,369 | 4/1962 | Butler et al. | 260/78 L |
| 3,086,962 | 4/1963 | Mottus et al. | 260/78 L |
| 3,148,174 | 9/1964 | Glickman et al. | 260/78 P |
| 3,562,221 | 2/1971 | Steinhofer et al. | 260/78 L |

Primary Examiner—William H. Short
Assistant Examiner—L. M. Phynes
Attorney—Paul A. Rose, Aldo John Cozzi, Gerald R. O'Brien, Jr. and James J. O'Connell

[57] ABSTRACT

A substituted biuret compound is used as an initiator or activator with alkaline catalyst in the anionic polymerization of lactam monomer so as to provide for a rapid polymerization process.

6 Claims, No Drawings

LACTAM POLYMERIZATION WITH SUBSTITUTED BIURET INITIATORS

BACKGROUND OF THE INVENTION

1. Field of the Invention

The invention relates to the anionic polymerization of lactam monomer.

2. Description of the Prior Art

In the anionic polymerization of lactams there is usually employed a catalyst/initiator system. The catalyst is commonly a material which will form an alkali or alkaline earth metal salt of the lactam.

Although there are a number of materials known to those in the art as initiators for such reactions, many of such initiators are not commercially useful because they either do not provide polymerization rates which are fast enough in the various types of molding equipment and processes which are used commercially, and which require relatively fast processing conditions, or the products produced with such initiators do not have commercially acceptable physical properties.

SUMMARY OF THE INVENTION

Lactams are anionically polymerized utilizing a catalyst-initiator system whereby the lactam may be readily polymerized in a relatively short period of time to produce commercially acceptable polymers. The polymerization system contains an anionic catalyst and, as the initiator or activator, one or more substituted biuret compounds.

An object of the present invention is to provide an anionic polymerization process whereby lactams may be readily polymerized in a relatively short period of time to provide high molecular weight nylon polymers.

Another object of the present invention is to provide a novel initiator or activator system for use in the anionic polymerization of lactam monomers.

DESCRIPTION OF THE PREFERRED EMBODIMENT

It has now been found that lactams may be polymerized anionically so as to provide the objects of the present invention if there is employed as the catalyst/initiator system for such polymerization an anionic catalyst and, as an initiator or activator, one or more substituted biuret compounds.

THE LACTAMS

The lactams which may be polymerized according to the present invention are all those which are capable of being polymerized anionically and are preferably those lactam monomers which contain at least one ring group of the structure

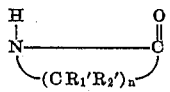

wherein $n$ is a whole number which is 3 to 13, and preferably 3 to 10, and $R'_1$ and $R'_2$ may be the same or different radicals on each carbon atom and may be H or $C_1$ to $C_{10}$ hydrocarbons.

Such lactams would include those having a single ring structure such as 2-pyrrolidone, 2-piperidone, 6-methyl-2-piperidone, ε-caprolactam, enantholactam, capryllactam, lauryllactam, decanolactam, undecanolactam, dodecanolactam, pentadecanolactam, hexadecanolactam, alkyl substituted caprolactams, aryl substituted lactams, and the like.

Lactams having a plurality of ring structures which may be used in the present invention include bis-lactams such as alkylene bis lactams of the formula:

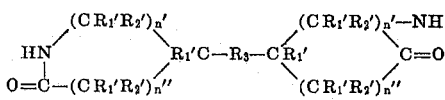

wherein $n'$ and $n''$ are each whole numbers such that $n'$ and $n''$ is 2 to 14; $R'_1$ and $R'_2$ are as defined above; and $R_3$ may be $C_1$ to $C_4$ alkylene such as methylene, ethylene, propylene and butylene; phenylene and substituted phenylene; O and S.

Other lactams having a plurality of ring structures include bicyclic lactams, such as those represented by the formulas:

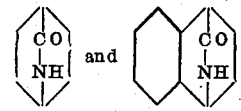

The lactams to be polymerized can be used individually or in any combination thereof.

THE INITIATORS

The initiator which is to be employed in the process of the present invention is a compound having the structure

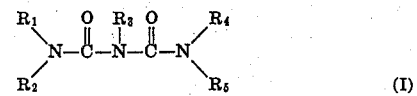

wherein $R_1$, $R_3$ and $R_5$ may be the same or different radicals which may be $C_1$ to $C_{20}$, and preferably $C_1$ to $C_{10}$, saturated or unsaturated hydrocarbon radicals and $R_2$ and $R_4$ may be the same or different radicals, and may be H or the same as $R_1$, $R_3$ and $R_5$. The hydrocarbon radicals may be aliphatic (linear, branched or cyclic), or aromatic (aryl, aralkyl or alkaryl) in nature. The preferred hydrocarbon radicals are aliphatic radicals, such as methyl, ethyl, propyl, isopropyl, n-butyl, t-butyl, n-pentyl, n-decyl, 2methyl-hexyl-1 and dodecyl; and phenyl.

The hydrocarbon radicals may also be substituted with substituents which are inert to the other components of the anionic polymerization systems of the present invention, and to the components of the reaction systems in which such (I) compounds are prepared.

The initiator compounds may be generally characterized as substituted biurets.

These biuret compounds may be prepared in a variety of manners as disclosed by F. Kurzer in Chemical Reviews, 56, 95 (1956).

One convenient method of preparing the biuret compounds is by the reaction of an allophanoyl halide compound of the structure

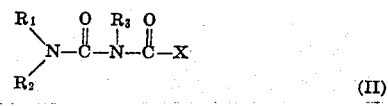

wherein X is a halogen radical, i.e. Cl, Br, F, or I, with an amine III of the formula

to produce biuret compound I and HX.

Such latter reaction may be conducted at temperatures of about 0° to 150° C., at atmospheric pressure. The reaction can be conducted in an acid accepting solvent such as pyridine.

Some of the biuret compounds may be prepared by reacting a suitably substituted urea with an isocyanate compound as illustrated by the following reaction:

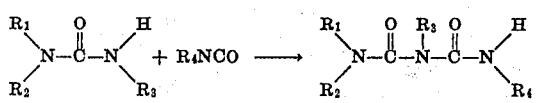

or compound I where $R_5 = H$.

Examples of these substituted biuret compounds are 1,3,5-trimethyl biuret, i.e., $CH_3NH—CO—NCH_3—CO—NHCH_3$; 1-

(m-trifluoromethylphenyl)-3-methyl-5-n-butyl-biuret, i.e., $(CF_3C_6H_4)$—NH—CO—NCH$_3$—CO—NH—(n-C$_4$H$_9$); and 1,3-dimethyl-5-(2'-methoxyethyl)biuret, i.e., CH$_3$NH—CO—NCH$_3$—CO—NH—C$_2$H$_4$—O—CH$_3$).

The initiators of the present invention may be used individually or in combination with one another or with one or more other initiators. About 0.1 to 10 moles of initiator are employed per 100 moles of lactam monomer being polymerized.

THE POLYMERS

The use of the initiators of the present invention results in the preparation of polymers by the following reactions:

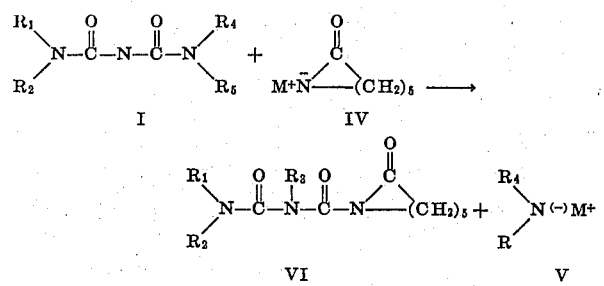

Other possible modes of reactions are:

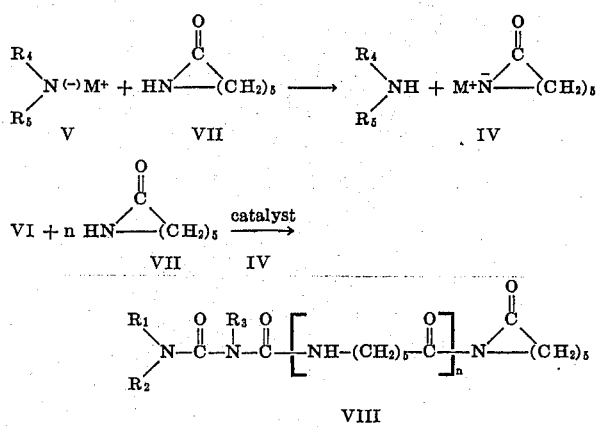

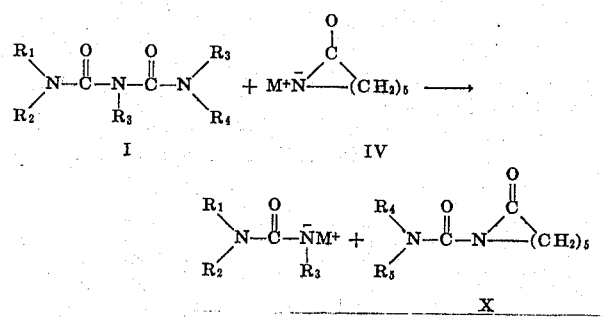

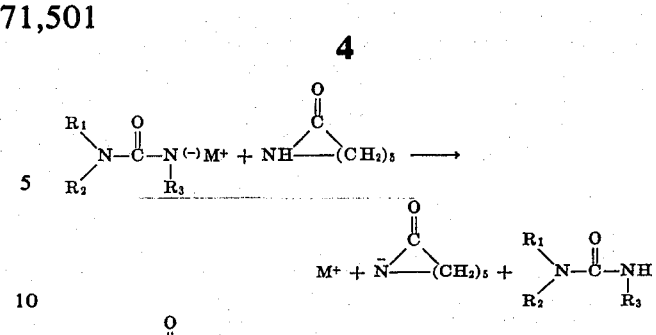

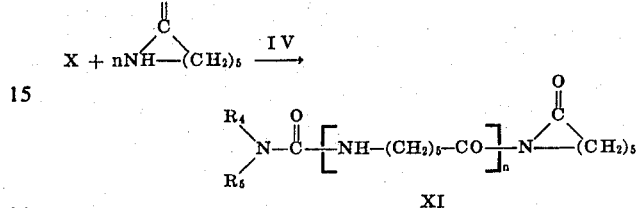

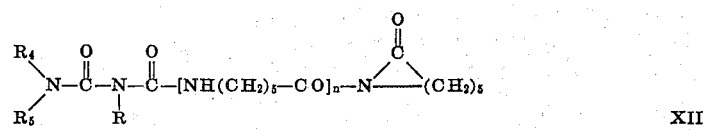

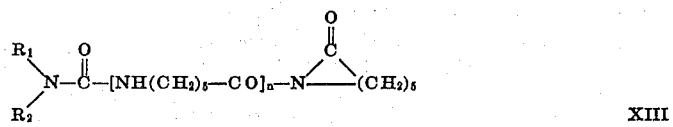

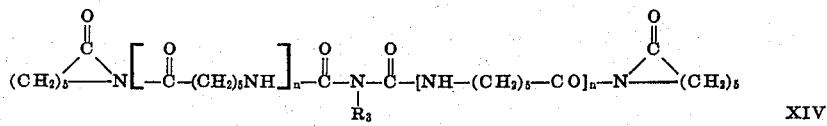

Thus, depending on the mode of reaction of the catalyst with the biuret and the mode of cleavage, the following structures for the polymer can be envisioned.

Structure XIV arises from the fact that structure VIII and XII still possess a reactive imide group in addition to the lactam, and, therefore, can function as an initiator also. Thus, the polymer can be any one or a mixture of these depending on the nature of the hydrocarbon residues.

The foregoing mechanism was shown for the case when ε-caprolactam is polymerized. With other lactams, the reaction schemes are similar. Thus a generalized reaction for all lactams may be shown by replacing the moiety (CH$_2$)$_5$ in the structures shown above with the moiety R' wherein R' would represent that portion of the structure of the lactam being polymerized which lies between the nitrogen atom and the carbonyl carbon atom of such lactam. In such reactions, also, R$_1$, R$_2$, R$_3$, R$_4$ and R$_5$ are as defined above,
M is the cation of the anionic catalyst, and
n is a whole number which is >1 and is such that the polymers produced in the resulting polymeric system are normally solid, i.e., solid at temperatures of about 25° C. and have reduced viscosities in m-cresol (0.1 gram/100 ml) at 25° C. of ≥ 0.4, and preferably about 0.8 to 7, deciliters/gram.

The value of n may vary somewhat in each polymerized lactam chain, and will be about 10 to about 5,000. The polymers would thus have molecular weights of about 1,000 to 500,000 or more.

The lactam polymers prepared with the biuret initiators of the present invention have good physical properties.

THE CATALYST

The catalysts which may be employed in the anionic polymerization reaction of the present invention include all anionic catalyst materials which may be employed in the anionic polymerization of lactams. The catalyst material is usually a salt of the lactam being polymerized although any other lactam may be used to form the catalyst. The salt is usually prepared by reacting the lactam with a strong base, i.e., a base strong enough to convert the lactam to its salt. Such bases would include alkali and alkaline earth metals or basic derivatives of such metals such as the hydroxides, oxides, alkoxides, phenoxides, hydrides, alkyls, aryls, amides, borohydrides and weak acid salts, i.e., acetates, carbonates, bicarbonates, benzoates, sulfites and bisulfites; Grignard reagents, and various other organometallic compounds. Such bases would include, therefore, metals such as lithium, sodium, potassium, magnesium, calcium, strontium, barium, and aluminum and derivatives of such metals, such as lithium hydroxide, sodium hydroxide, potassium hydroxide, magnesium hydroxide, calcium hydroxide, strontium hydroxide, barium hydroxide, lithium hydride, sodium hydride, sodium oxide, sodium methoxide, sodium phenoxide, sodium methyl, sodium ethyl, sodium phenyl, sodium maphthyl, and sodamide; Grignard reagents such as ethyl magnesium chloride, methyl magnesium bromide, and phenyl magnesium bromide; and other compounds such as zinc diethyl, triisopropyl aluminum, diisobutyl aluminum hydride, and lithium aluminum hydride.

About 0.2 to 20, preferably 0.5 to 6 mole percent of catalyst is used per mole of monomer being polymerized.

The catalyst and initiator are employed in a mole ratio to each other of about 2 to 20, and preferably, 3 to 12.

When the strong base is reacted with the lactam to form the catalyst a by-product is usually formed. For example, hydrogen is formed as a by-product when the metal hydrides or the elemental metals are used; water is formed as a by-product when metal hydroxides are used; alcohols are formed when alkoxides are used and water and $CO_2$ are formed when carbonate or bicarbonate salts are used. The preferred catalysts are those which result in the most readily removable by-products, since some of the by-products, such as $H_2O$, may have a deleterious effect on the polymerization reaction.

THE POLYMERIZATION PROCESS

The polymerization reaction is preferably conducted in bulk. Under such bulk polymerization procedures the monomer, catalyst and initiator are charged in the desired proportions to the reactor. The bulk polymerization reaction is usually conducted at atmospheric pressure and at a temperature of about 100° to 250° C. The reaction can be conducted at a temperature which is above or below the melting point of the resulting polymer, and above that of the monomer. The use of elevated pressure is not required for the polymerization reaction. The bulk polymerization reaction requires a polymerization period of about 3 to 15 minutes at 100°–250° C., depending on the lactam(s) employed, and the polymerization temperature. The bulk polymerization reaction should be carried out under anhydrous conditions, i.e., in the presence of no more than about 0.3 weight percent, and preferably no more than 0.03 weight percent, of water or other active hydrogen containing by-product. Where a catalyst is used which would generate water or other active hydrogen containing by-products, such as the hydroxide, alkoxide or phenoxide catalysts, the excess amounts of such by-product materials should be removed before the polymerization reaction is conducted.

The polymerization is preferably carried out under an inert blanket of gas, such as, nitrogen, argon or helium in order to prevent oxidative degradation of the monomer and destruction of the catalyst by moisture.

The reaction may be carried out batchwise or continuously. An advantageous method of carrying out the reaction of the present invention is to conduct the bulk polymerization in conventional molding equipment such as a rotational casting device or a compression molding machine, or an extruder. In this way the polymer and the molded objects can both be formed in one step. Where the polymerization is conducted in such molding devices, conventional molding pressures may be employed in order to simultaneously form the molded object with the in situ formed polymer.

Since the lactams are normally solid materials at room temperatures, the bulk polymerization reactions may be carried out by various procedures. In one procedure, the lactam may be melted, and both the catalyst and the initiator admixed with it and then the reaction may be caused to proceed by bringing the reaction mixture to polymerization temperatures.

In another procedure, the catalyst and initiator may be dissolved separately in the lactam monomer, after which the two separate solutions may be combined to cause the polymerization to proceed at polymerization temperatures. Where the polymerization is conducted in molding equipment, the equipment may be heated to the desired polymerization temperature in order to effect polymerization upon injection therein of the polymerization reaction system.

In addition to being conducted in bulk, the polymerization may also be conducted in high boiling inert organic solvents, i.e., those having boiling points of about 100° C., such as chlorobenzene, dichlorobenzene, xylene, trichlorobenzene, dimethyl sulfoxide, N-alkyl pyrrolidones and hexamethylphosphoramide at temperatures of about 100° C. up to the boiling point of the solvent; or at temperatures of about 130° to 240° C. in dispersion systems such as those disclosed in U.S. Pat. Nos. 3,061,592 and 3,383,352, and by G.B. Gechele and G.F. Martins in J. Applied Polymer Science 9, 2939 (1965).

ADJUVANTS

The polymerization reaction of the present invention may also be conducted in the presence of various types of adjuvant materials which are normally employed with the types of polymers prepared by the present invention, or the adjuvants may be added to the polymer after it is formed. Such adjuvant materials would include fillers, stabilizers, fibrous reinforcing agents such as asbestos and glass fiber, and pigmenting materials.

The particular polymer being prepared as well as the end use application will dictate the selection and quantity of the adjuvant to be employed therewith since it is the respective adjuvants for such polymers and such applications that are to be employed in the present invention. The adjuvants employed must be physically and chemically compatible with each of the other components of the monomer and polymer based compositions, under the prescribed operating conditions. As such, where they are present during the polymerization reaction, the adjuvants should not contain reactive groups which would interfere with the polymerization reactions, such as active hydrogen containing groups such as carboxyl, amino, mercaptan or hydroxyl groups.

The adjuvants would be used in amounts which would be effective for intended purpose. Thus, a stabilizer would be used in a stabilizingly effective quantity, and the fillers would be used in effective quantities therefor. For example, if a reinforcing filler were to be used, such filler should be used in such amounts as to provide the desired reinforcing effect.

The polymers made by the process of the present invention may be used for a number of applications which require the use of molded articles prepared from lactam polymers such as fibers, films, engineering structures, coatings and hollow articles such as tubing and solvent tanks.

The following examples are merely illustrative of the present invention and are not intended as a limitation upon the scope thereof.

The general procedure employed for the polymerization of ε-caprolactam in the examples herein is as follows:

Into each of two 25 × 200 mm test tubes was added 28.3 g.

(0.25 mole) of dry ( ≥ 0.03 percent H₂O) molten ε-caprolactam, and both were then heated at the desired polymeration temperature. Sodium hydride in the form of a dispersion (57 percent) in mineral oil was added to one of these test tubes, while the initiator was added to the other. After solutions were formed and equilibrated with the bath temperature, they were mixed and a thermocouple was inserted in the resulting mixture. The progress of the polymerization was followed both visually and by observing the reaction temperature which, due to the exotherm of the reaction, rises initially. Thus the rate with which the reaction reaches peak temperature is an indication of the polymerization rate. The time required for the development of opacity was taken as an indication of the time required for crystallization of the Nylon 6 formed.

EXAMPLE 1

The polymerization of ε-caprolactam promoted by 1,3,5-trimethylbiuret was compared with the polymerization of ε-caprolactam using s-diphenylurea and toluene diisocyanate (TDI) as initiators, at sodium hydride (catalyst) and initiator concentrations of 2 and 0.5 mole percent, respectively. Data from such experiments are summarized in Table I below and the data clearly shows that the polymerization rate of caprolactam promoted by 1,3,5-trimethylbiuret is comparable to that promoted by TDI.

EXAMPLE 2

A lower molecular weight Nylon 6 product was prepared by using 0.9 mole percent of 1,3,5-trimethylbiuret as the initiator with 2 mole percent of NaH catalyst at 140° C. Under these conditions, the crystallization time was 40 seconds, and after a 5 minute heating cycle that R.V. (reduced viscosity) of the polymer was 0.78 and the percent of water insoluble values in the polymer was 97.5.

EXAMPLE 3

Very high molecular weight polymer can be prepared by conducting the polymerization with low concentrations of initiator and catalyst. Thus, when 0.3 mole percent of 1,3,5-trimethylbiuret was used with 0.5 mole percent catalyst, the crystallization time was 2.5 minutes, and after 5 minutes heating cycle at 155° C. the R.V. was found to be 2.12.

The color of the polymers produced in the examples was a good, off-white color.

TABLE I.—COMPARISON OF INITIATOR EFFICIENCY

| Initiator | Polymerization temp.,° C. | Time for no flow seconds | Time for crystallization seconds | Heat cycle time at 150° C.* | Percent H₂Oᵃ Extractable | R.V.,ᵇ dl./gm. |
|---|---|---|---|---|---|---|
| 1,3,5-trimethyl biuret | 150 | 50 | 60 | 5 | 2.8 | 1.12 |
| Diphenylurea | 160 | 390 | 600 | 12 | 21.8 | |
| TDI | 150 | 24 | 32 | 5 | 3.7 | gel |

ᵃ 24 hours boiling H₂O Soxlet extraction.
ᵇ 0.1 gm/100 ml. m-cresol at 25° C. (a and b are tests conducted on the polymeric products produced after full heat cycle time.)
* Minutes.

EXAMPLES 4–7

Using the procedure noted above, various biuret compounds were tested as ε-caprolactam polymerization initiators. The polymerization reactions were conducted at 150° C. using 2 mole percent of NaH as catalyst and 0.5 mole percent of the biuret compound as initiator. The polymers produced with the initiators of the present invention, i.e. in Examples 6 and 7, had a good off-white color. The initiators used in Examples 4 and 5, i.e., biuret, NH₂—CO—NH—CO—NH₂, and 1,3-dimethyl biuret, CH₃NH—CO—NCH₃—CO—NH₂, did not produce any polymer as noted. These examples thus illustrate the utility of the specific substituted biuret compounds of the present invention as lactam anionic polymerization initiators.

The speed with which the tested biuret compounds functioned as initiators is disclosed below in Table II, which lists the initiator used, and, where applicable, the resulting no flow time and crystallization time achieved with each of the initiators.

TABLE II

| Example | Initiator | No flow time, minutes | Crystallization time, minutes |
|---|---|---|---|
| 4 | Biuret | (¹) | (¹) |
| 5 | 1,3-dimethyl biuret | (²) | (²) |
| 6 | 1,3-dimethyl-5-(2'-methoxyethyl)-biuret | 1 | 1.5 |
| 7 | 1-n-butyl-3-methyl-5-(m-trifluoromethyl-phenyl)biuret | 3.5 | 4 |

¹ No polymerization observed after 1 hour.
² No polymerization observed after ½ hour.

What is claimed is:

1. A process for anionically polymerizing ε-caprolactam to a moldable polymer with an anionic lactam polymerization catalyst and an anionic lactam polymerization initiator which comprises using as said initiator at least one biuret compound having the structure

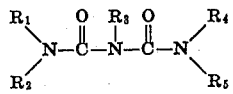

wherein $R_1$, $R_3$ and $R_5$ are the same or different monovalent radicals and are $C_1$ to $C_{20}$ hydrocarbon radicals which are unsubstituted or substituted with substituents which are inert to the other components of the polymerization system, and $R_2$ and $R_4$ are the same or different monovalent radicals and are H or $C_1$ to $C_{20}$ hydrocarbon radicals which are unsubstituted or substituted with substituents which are inert to the other components of the polymerization system.

2. A process as in claim 1 in which $R_2$ and $R_4$ are H.

3. A process as in claim 2 in which said biuret compound is 1,3,5-trimethyl biuret.

4. A process as in claim 2 in which said biuret compound is 1,3-dimethyl-5-(2'-methoxyethyl)biuret.

5. A process as in claim 2 in which said biuret compound is 1-n-butyl-3-methyl-5-(m-trifluoromethylphenyl)-biuret.

6. A process as in claim 1 which is conducted in a shaping device with the simultaneous formation of a shaped object.

* * * * *

UNITED STATES PATENT OFFICE
CERTIFICATE OF CORRECTION

Patent No. 3,671,501    Dated June 20, 1972

Inventor(s) Herbert E. Johnson

It is certified that error appears in the above-identified patent and that said Letters Patent are hereby corrected as shown below:

Column 1, lines 71-75, that portion of the formula reading

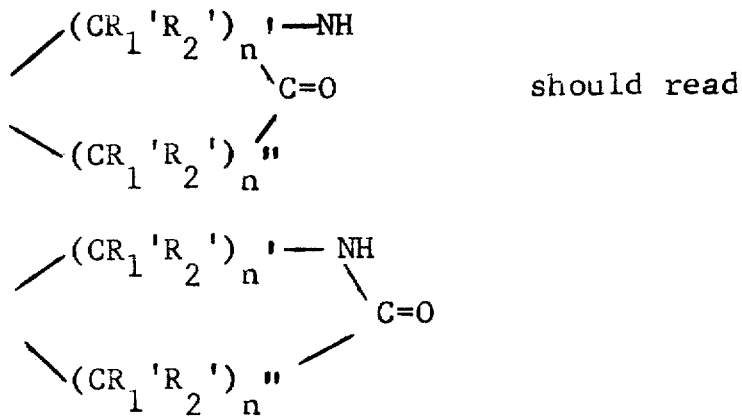

should read

Column 2, line 42, "56" should read --$\underline{56}$--;

Column 4, line 32, that portion of structure XII reading
$\begin{array}{c}-N-\\|\\R\end{array}$ should read $\begin{array}{c}-N-\\|\\R_3\end{array}$ ;

Column 5, line 21, "maphthyl" should read --naphthyl--;

Column 7, line 1, "$\geq$" should read --$\leq$--;

Signed and sealed this 2nd day of January 1973.

(SEAL)
Attest:

EDWARD M. FLETCHER, JR.
Attesting Officer

ROBERT GOTTSCHALK
Commissioner of Patents